(12) United States Patent
Amagasa

(10) Patent No.: US 8,897,970 B2
(45) Date of Patent: Nov. 25, 2014

(54) WIPER CONTROL DEVICE AND WIPER CONTROL METHOD

(75) Inventor: Toshiyuki Amagasa, Kiryu (JP)

(73) Assignee: Mitsuba Corporation, Gunma (JP)

(*) Notice: Subject to any disclaimer, the term of this patent is extended or adjusted under 35 U.S.C. 154(b) by 820 days.

(21) Appl. No.: 13/167,116

(22) Filed: Jun. 23, 2011

(65) Prior Publication Data

US 2012/0325265 A1    Dec. 27, 2012

(51) Int. Cl.
*B60S 1/04* (2006.01)
*B60S 1/08* (2006.01)

(52) U.S. Cl.
CPC .............. *B60S 1/08* (2013.01); *B60S 1/0896* (2013.01); *B60S 1/0818* (2013.01)
USPC ............................................. 701/49; 318/453

(58) Field of Classification Search
CPC ............ B60S 1/04; B60S 1/08; B60S 1/0803; B60S 1/0807; B60S 1/0818; B60S 1/0896; B60S 1/105; H02P 1/04; H02P 3/00; H02P 5/00; H02P 7/00; H02P 1/00
USPC .............. 701/36, 49; 318/280, 281, 282, 443, 318/444, 445, 453, 455, 474, 472; 15/250.12, 250.13
See application file for complete search history.

(56) References Cited

U.S. PATENT DOCUMENTS

| 6,696,808 | B2 |   | 2/2004  | Schmid et al. |          |
|-----------|----|---|---------|---------------|----------|
| 6,958,585 | B2 | * | 10/2005 | Kim           | 318/2    |
| 7,009,355 | B2 | * | 3/2006  | Heo           | 318/483  |
| 8,581,530 | B2 | * | 11/2013 | Tisch         | 318/282  |

FOREIGN PATENT DOCUMENTS

| JP | 2003-525167 | 8/2003  |
|----|-------------|---------|
| JP | 2008-245473 | 10/2008 |

* cited by examiner

*Primary Examiner* — Richard Camby
(74) *Attorney, Agent, or Firm* — Wenderoth, Lind & Ponack, L.L.P.

(57) ABSTRACT

A point value corresponding to a load state of an electric motor is set. The load state of the electric motor is detected so as to calculate a load point value of the electric motor and accumulate the load point values (S3, S4). A wiper-device operation mode is identified (S6). A difference Ptd between the accumulated load point value for forward operations and the accumulated load point value for return operations is compared with a criterion threshold value SVb (S24). When the difference Ptd exceeds the criterion threshold value SVb, it is determined that a vehicle is in a high-speed running state. Then, an angle of rotation of the electric motor is reduced to narrow a wiping angle of the wiper blade (S25). In this manner, an upper reversal position is set closer to a return side than a given position. As a result, overrun caused by the deflection of a blade or the like due to a wind generated by running when the vehicle is running at a high speed is prevented.

5 Claims, 9 Drawing Sheets

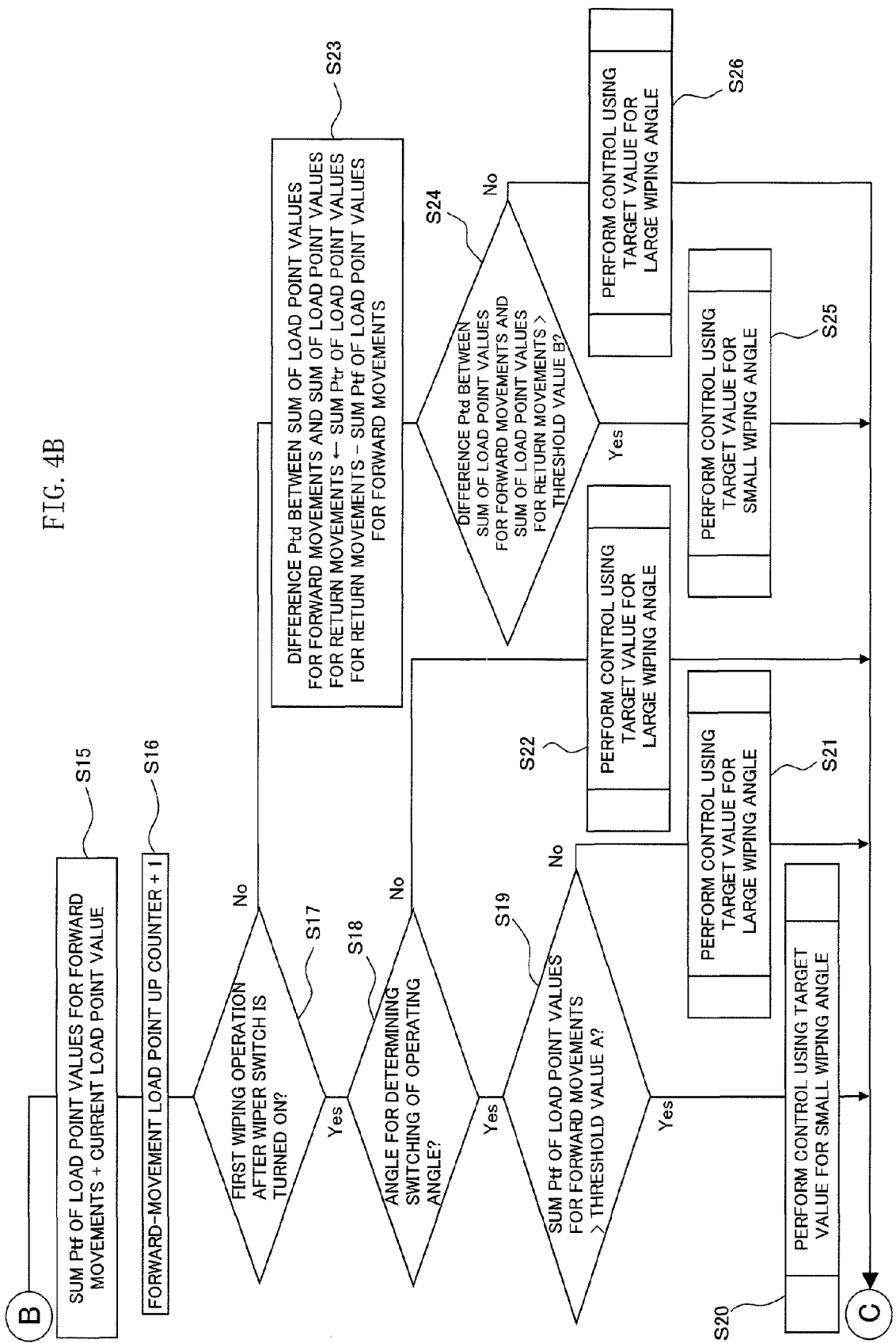

WIPER CONTROL DEVICE AND WIPER CONTROL METHOD

BACKGROUND OF THE INVENTION

1. Field of the Invention

The present invention relates to an overrun prevention technology for a vehicular wiper device. In particular, the present invention relates to a wiper control device and a wiper control method, which are effective to prevent a phenomenon in which an overrun state is brought about by the outward movement of a blade distal end at an upper reversal position due to the deflection generated in a wiper arm or a wiper blade during high-speed running.

2. Description of the Related Art

The following wiper system is conventionally widely used for automobile wiper devices. The wiper system detects a current position of a wiper blade (hereinafter, abbreviated as "blade") on a glass surface and causes the blade to perform a reciprocating wiping operation between an upper reversal position and a lower reversal position based on the detected data. With the wiper system described above, an operation of a wiper driving motor is controlled so that a direction of the operation of the blade is reversed at the predetermined upper reversal position and lower reversal position. The wiper driving motor is driven by an on-vehicle control device. The operation of the wiper driving motor is controlled so that a motor shaft of the wiper driving motor is stopped at an angle corresponding to the upper or lower reversal position.

In the conventional wiper system as described above, the control is performed so as not to change an operating angle of the motor shaft during running in a normal state. In this manner, the overrun of the blade (state in which the blade travels beyond a predetermined stop position) is prevented from occurring at the upper or lower reversal position. During high-speed running, however, a wiper arm, the blade, or a link mechanism is deflected against a wind generated by running. As a result, there arises a problem in that a blade distal end is disadvantageously moved outward when the direction of the operation of the blade is reversed at the upper reversal position. Specifically, even if the motor shaft is controlled to stop at a predetermined angle, there inevitably arises a problem of the occurrence of the overrun state due to the outward movement of the blade distal end during high-speed running.

On the other hand, if a wiping angle during a normal wiping operation is set small in view of the overrun occurring during the high-speed running, the problem due to the outward movement of the blade distal end can be avoided. However, the reduced wiping angle during the normal wiping operation has the undesirable effects of narrowing a field of view of a driver when it rains. In view of the problems described above, a system capable of preventing the overrun during the high-speed running and ensuring the field of view of a driver during the normal wiping operation is desired.

SUMMARY OF THE INVENTION

An object of the present invention is to provide a wiper control device and a wiper control method, which are capable of preventing overrun during high-speed running and ensuring a field of view during a normal wiping operation by suppressing the overrun due to the deflection of a wiper arm or the like during the high-speed running.

According to the present invention, provided is a wiper control device for controlling driving of a wiper device including a wiper blade provided on a surface to be wiped of a vehicle and an electric motor for driving the wiper blade, including: a storage section for storing a point value set corresponding to a load state of the electric motor; a point-value calculating section for detecting a current load state of the electric motor to calculate a load point value of the electric motor from the detected load state based on the point value stored in the storage section; a point-value adding section for accumulating the load point values to calculate an accumulated load point value; a point-value comparing section for comparing a difference between the accumulated load point value for forward operations of the wiper blade and the accumulated load point value for return operations of the wiper blade with a predetermined threshold value; a wiping-state determining section for detecting effects of a wind-pressure load due to a wind generated by running on the wiper blade based on results of the comparison in the point-value comparing section to determine whether the vehicle is in a high-speed running state; and a motor-driving command section for issuing an operation command to the electric motor based on results of the determination in the wiping-state determining section.

According to the present invention, the point value is preset corresponding to the load state of the motor. With the actuation of the wiper device, the load point value corresponding to the current load state is calculated. The sum of the load point values for the forward movements and the sum of the load point values for the return movements are respectively obtained to calculate the forward-movement accumulated load point value and the return-movement accumulated load point value. Focusing attention on the difference between the forward-movement accumulated load point value and the return-movement accumulated load point value, the difference between the forward-movement accumulated load point value and the return-movement accumulated load point value is compared with the predetermined threshold value. In this manner, the effects of the wind-pressure load due to the wind generated by running on the wiper blade are detected so as to determine whether or not the vehicle is in the high-speed running state. When the vehicle is in the high-speed running state, the overrun of the blade is prevented by, for example, narrowing a wiping angle of the wiper blade.

In the wiper control device, the wiping-state determining section may determine that the vehicle is in the high-speed running state when the difference between the accumulated load point value for the forward operations of the wiper blade and the accumulated load point value for the return operations of the wiper blade exceeds the predetermined threshold value, and command the motor-driving command section to reduce an angle of rotation of the electric motor to narrow a wiping angle of the wiper blade.

According to another aspect of the present invention, provided is a wiper control device for controlling driving of a wiper device including a wiper blade provided on a surface to be wiped of a vehicle and an electric motor for driving the wiper blade, including: a storage section for storing a point value set corresponding to a load state of the electric motor; a point-value calculating section for detecting a current load state of the electric motor to calculate a load point value of the electric motor from the detected load state based on the point value stored in the storage section; a point-value adding section for accumulating the load point values to calculate an accumulated load point value; a point-value comparing section for comparing the accumulated load point value for forward operations of the wiper blade with a first threshold value, comparing the accumulated load point value for return operations of the wiper blade with a second threshold value, and comparing a difference between the accumulated load point value for the forward operations of the wiper blade and the accumulated load point value for the return operations of the wiper blade with a third threshold value; a wiping-state determining section for detecting effects of a wind-pressure load due to a wind generated by running on the wiper blade based on results of the comparison in the point-value comparing section to determine whether the vehicle is in a high-speed running state; and a motor-driving command section for issuing an operation command to the electric motor based on results of the determination in the wiping-state determining section.

According to the present invention, the types of point value set corresponding to the load state of the motor are classified into the sum of the point values for the forward operations of the wiper blade, the sum of the point values for the return operations of the wiper blade, and a difference between the sums. Then, the operating states of the wiper device are classified into a larger number of categories. Then, by comparing each of the values with each corresponding predetermined threshold value, the effects of the wind-pressure load due to the wind generated by running on the wiper blade are detected so as to determine whether or not the vehicle is in the high-speed running state. When the vehicle is in the high-speed running state, the overrun of the blade is prevented by, for example, narrowing the wiping angle of the wiper blade.

In the wiper control device, the wiping-state determining section may determine that the vehicle is in the high-speed running state when the difference between the accumulated load point value for the forward operations of the wiper blade and the accumulated load point value for the return operations of the wiper blade is equal to or larger than the third threshold value in a case where the accumulated load point value for the forward operations of the wiper blade is less than the first threshold value and the accumulated load point value for the return operations of the wiper blade is equal to or larger than the second threshold value, and command the motor-driving command section to reduce an angle of rotation of the electric motor to narrow a wiping angle of the wiper blade. In addition, each of the first threshold value, the second threshold value, and the third threshold value may be set to a different value for a case where an operation of the wiper blade is performed in a Hi speed mode and for a case where the operation of the wiper blade is performed in a Lo speed mode.

According to the present invention, provided is a wiper control method used for a wiper device including a wiper blade provided on a surface to be wiped of a vehicle and an electric motor for driving the wiper blade, including: setting a point value corresponding to a load state of the electric motor; detecting a current load state of the electric motor to calculate a load point value of the electric motor from the detected load state based on the point value; accumulating the load point values to calculate an accumulated load point value; comparing a difference between the accumulated load point value for forward operations of the wiper blade and the accumulated load point value for return operations of the wiper blade with a predetermined threshold value; detecting effects of a wind-pressure load due to a wind generated by running on the wiper blade based on results of the comparison to determine whether the vehicle is in a high-speed running state; and controlling an operation of the electric motor based on results of the determination.

According to the present invention, the point value is preset corresponding to the load state of the motor. With the actuation of the wiper device, the load point value corresponding to the current load state is calculated. The sum of the load point values for the forward movements and the sum of the load point values for the return movements are respectively obtained to calculate the forward-movement accumulated load point value and the return-movement accumulated load point value. Focusing attention on the difference between the forward-movement accumulated load point value and the return-movement accumulated load point value, the difference between the forward-movement accumulated load point value and the return-movement accumulated load point value is compared with the predetermined threshold value. In this manner, the effects of the wind-pressure load due to the wind generated by running on the wiper blade are detected so as to determine whether or not the vehicle is in the high-speed running state. When the vehicle is in the high-speed running state, the overrun of the blade is prevented by, for example, narrowing a wiping angle of the wiper blade.

The wiper control method may further include: determining that the vehicle is in the high-speed running state when the difference between the accumulated load point value for the forward operations of the wiper blade and the accumulated load point value for the return operations of the wiper blade exceeds the predetermined threshold value; and reducing an angle of rotation of the electric motor to narrow a wiping angle of the wiper blade.

According to another aspect of the present invention, provided is a wiper control method used for a wiper device including a wiper blade provided on a surface to be wiped of a vehicle and an electric motor for driving the wiper blade, including: setting a point value corresponding to a load state of the electric motor; detecting a current load state of the electric motor to calculate a load point value of the electric motor from the detected load state based on the point value; accumulating the load point values to calculate an accumulated load point value; comparing the accumulated load point value for forward operations of the wiper blade with a first threshold value, comparing the accumulated load point value for return operations of the wiper blade with a second threshold value, and comparing a difference between the accumulated load point value for the forward operations of the wiper blade and the accumulated load point value for the return operations of the wiper blade with a third threshold value; detecting effects of a wind-pressure load due to a wind generated by running on the wiper blade based on results of the comparison to determine whether the vehicle is in a high-speed running state; and controlling an operation of the electric motor based on results of the determination.

According to the present invention, the types of point value set corresponding to the load state of the motor are classified into the sum of the point values for the forward operations of the wiper blade, the sum of the point values for the return operations of the wiper blade, and a difference between the sums. Then, the operating states of the wiper device are classified into a larger number of categories. Then, by comparing each of the values with each corresponding predetermined threshold value, the effects of the wind-pressure load due to the wind generated by running on the wiper blade are detected so as to determine whether or not the vehicle is in the high-speed running state. When the vehicle is in the high-speed running state, the overrun of the blade is prevented by, for example, narrowing the wiping angle of the wiper blade.

The wiper control method may further include: determining that the vehicle is in the high-speed running state when the difference between the accumulated load point value for the forward operations of the wiper blade and the accumulated load point value for the return operations of the wiper blade is equal to or larger than the third threshold value in a case where the accumulated load point value for the forward operations of the wiper blade is less than the first threshold value and the accumulated load point value for the return operations of the wiper blade is equal to or larger than the second threshold value; and reducing an angle of rotation of the electric motor to narrow a wiping angle of the wiper blade. In addition, each of the first threshold value, the second threshold value, and the third threshold value may be set to a different value for a case where an operation of the wiper blade is performed in a Hi speed mode and for a case where the operation of the wiper blade is performed in a Lo speed mode.

BRIEF DESCRIPTION OF THE DRAWINGS

In the accompanying drawings:

FIGS. 4A-4C are flowcharts of control processing according to Embodiment 1 of the present invention;

DETAILED DESCRIPTION OF THE PREFERRED EMBODIMENTS

Hereinafter, embodiments of the present invention are described in detail based on the accompanying drawings.

Embodiment 1

Figure 1:
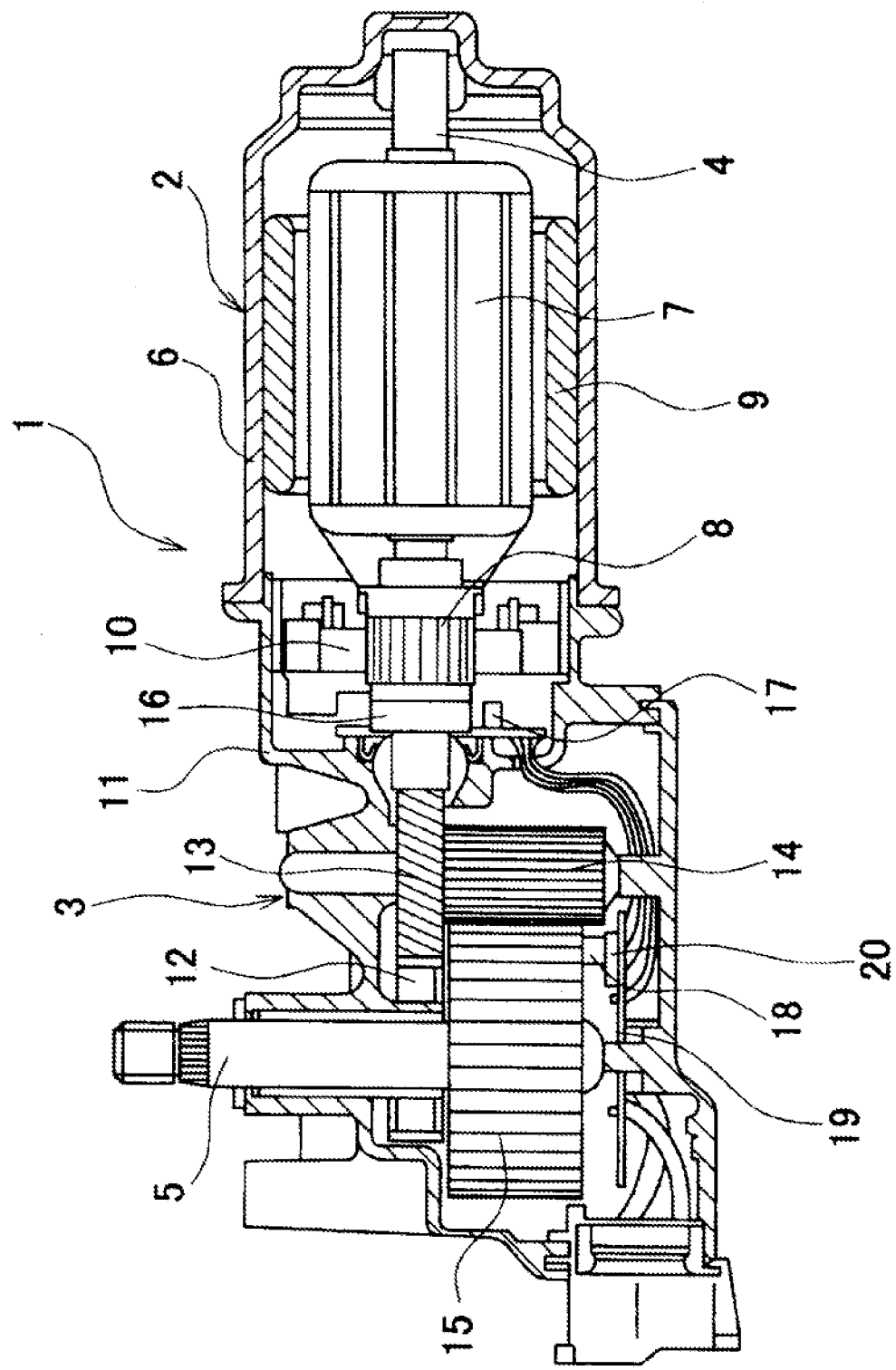
FIG. 1 is an explanatory view illustrating a configuration of a motor unit used for a wiper device driven by a control device and a control method according to Embodiment 1 of the present invention.

FIG. 1 is an explanatory view illustrating a configuration of a motor unit used for a wiper device driven by a control device and a control method according to Embodiment 1 of the present invention. A motor unit 1 illustrated in FIG. 1 is used as a driving source for an automobile wiper device. The motor unit 1 is connected to a wiper arm (not shown) through an intermediation of a link mechanism (not shown). A wiper blade (not shown; hereinafter, abbreviated as "blade") is mounted to the wiper arm. When the blade reaches an upper or lower reversal position, a direction of rotation of a motor 2 included in the motor unit 1 is switched, that is, to a forward direction or a reverse direction. In this manner, the blade makes a reciprocating movement on a windshield surface to wipe water droplets and dust off the glass surface.

The motor unit 1 includes the motor 2 and a gear box 3. The rotation of a motor shaft 4 of the motor 2 is decelerated in the gear box 3 and is then output to an output shaft 5. The motor shaft 4 is rotatably supported by a cylindrical yoke 6 having a closed end. An armature core 7, around which a coil is wound, and a commutator 8 are mounted to the motor shaft 4. A plurality of permanent magnets 9 are fixed on an inner surface of the yoke 6. A power-feeding brush 10 is held in slidable contact with the commutator 8. The number of revolutions (speed) of the motor 2 is controlled by the amount of current fed to the brush 10.

A case frame 11 of the gear box 3 is mounted to an end edge portion of the yoke 6 on an opening side. A distal end portion of the motor shaft 4 projects from the yoke 6 to be housed within the case frame 11. A worm 12 is formed at the distal end portion of the motor shaft 4. A worm wheel 13 rotatably supported by the case frame 11 is meshed with the worm 12. A first gear 14 having a small diameter is coaxially provided integrally with the worm wheel 13. A second gear 15 having a large diameter is meshed with the first gear 14. The output shaft 5 rotatably supported by the case frame 11 is integrally mounted to the second gear 15. Although not shown, another worm, for which a direction of twist of the gear is opposite to that for the worm 12, is formed on the motor 4 so as to be adjacent to the worm 12. The worm (not shown) transmits power to the second gear 15 by speed-reducing members similar to the worm wheel 13 and the first gear 14.

A driving force of the motor 2 is output to the output shaft 5 after being decelerated through the worm 12, the worm wheel 13, the first gear 14, and the second gear 15. A crank arm (not shown) of the wiper device is mounted to the output shaft 5. When the motor 2 is actuated, the crank arm is driven through an intermediation of the output shaft 5. As a result, the wiper arm is actuated through an intermediation of the link mechanism connected to the crank arm.

A multi-polar magnetized magnet 16 (hereinafter, abbreviated as "magnet" 16) is mounted to the motor shaft 4. Correspondingly, two hall ICs 17 are provided inside the case frame 11 so as to be opposing to an outer circumferential portion of the magnet 16. The hall ICs 17 are provided at positions having an angular difference of 90 degrees with respect to the center of the motor shaft 4. In the motor 2, the magnet 16 is magnetized to have six poles. When the motor shaft 4 makes one revolution, a pulse output for six cycles is obtained from each of the hall ICs 17. Pulse signals respectively having phases shifted by a ¼ cycle from each other are output from the two hall ICs 17.

By detecting timing of appearance of the pulses from the hall ICs 17, the direction of rotation of the motor shaft 4 can be identified, which in turn allows the determination of whether a wiper-device operation is in a forward movement or a return movement. Moreover, a rotational speed of the motor shaft 4 can be detected based on the cycle of the pulse output of any one of the hall ICs 17. The number of revolutions of the motor shaft 4 and a speed of the blade have a correlation based on a speed reduction ratio and a link-operation ratio. Therefore, the speed of the blade can further be calculated from the number of revolutions of the motor shaft 4.

A magnet 18 for detecting an absolute position is mounted on a bottom surface of the second gear 15. A printed board 19 is mounted on the case frame 11. A hall IC 20 is provided on the printed board 19 so as to be opposing to the magnet 18. The number of the magnet 18 provided on the bottom surface of the second gear 15 is one. The magnet 18 faces the hall IC 20 when the blade reaches the lower reversal position. The crank arm is mounted to the second gear 15 as described above, and the second gear 15 rotates by 180 degrees so that the blade makes the reciprocating movement. When the second gear 15 rotates to bring the blade to the lower reversal position, the hall IC 20 and the magnet 18 face each other. As a result, a pulse signal is output from the hall IC 20.

Figure 2:
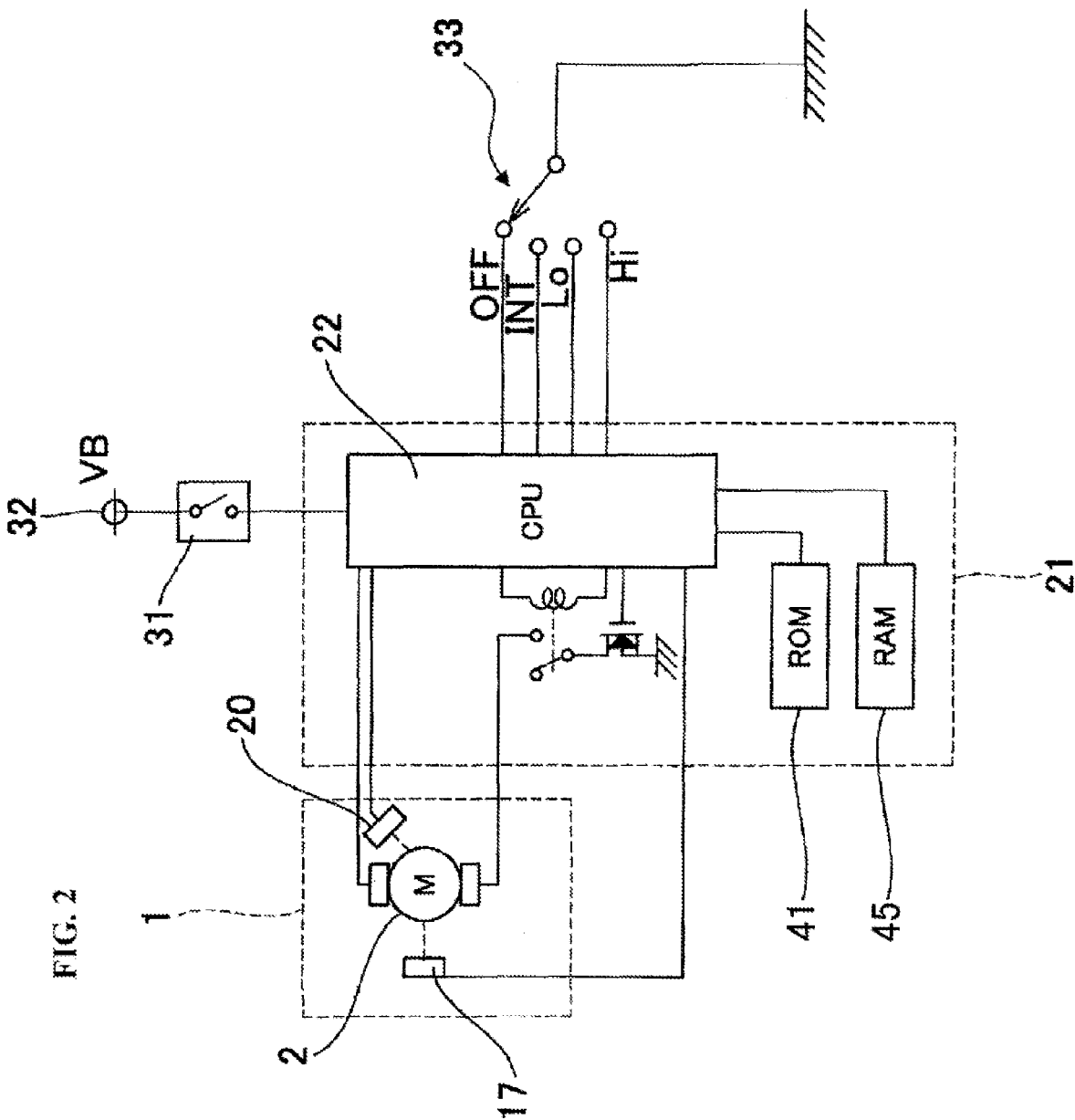
FIG. 2 is an explanatory view illustrating a configuration of a motor control system according to Embodiment 1 of the present invention.

The pulse outputs from the hall ICs 17 and 20 are transmitted to a wiper-driving control device (motor control device) 21. FIG. 2 is an explanatory view illustrating a configuration of a control system for the motor 2. A CPU (control section) 22 of the wiper-driving control device 21 is connected to a battery 32 through an intermediation of an ignition switch 31. A wiper switch 33 is connected to the CPU 22. An operation mode (ON/OFF and Hi/Lo/INT) of the wiper device is switched by the wiper switch 33. The CPU 22 is connected to the hall ICs 20 and 17. The position of the blade is identified by using the pulse output from the hall IC 20 as an absolute position signal. The pulse signals from the hall ICs 17 are used as relative position signals of the blade. The CPU 22 counts the number of pulses after the acquisition of the absolute position signal to identify a current position of the blade. In this case, the current position of the blade is detected by the combination of the absolute position signal indicating the lower reversal position from the hall IC 20 and the number of pulses output from the hall ICs 17. In this manner, the wiper-driving control device 21 identifies the current position and the speed of the blade and controls the motor 2 based on the obtained data.

The CPU 22 detects the number of revolutions of the motor 2 from the motor pulses from the hall ICs 17. The motor 2 is subjected to feedback control based on the detected revolutions. PWM control is performed on the motor 2 so that the CPU 22 appropriately controls the application of a voltage according to control conditions and the detected revolutions so as to appropriately change an ON-time ratio. Specifically, the CPU 22 calculates the motor revolutions based on the motor pulses from the hall ICs 17 and also sets a duty ratio (Duty) of the ON period of the PWM control according to the motor revolutions. As a result, the voltage applied to the motor 2 is effectively changed to control the number of revolutions of the motor 2 to a desired value. Although a period (Hz) of the motor pulse is processed directly as the number of revolutions in the CPU 22, the control may alternatively be performed based on the number of revolutions obtained from the pulse period.

On the other hand, in the CPU 22, predictive processing for a wind pressure of a wind generated by running is performed based on the motor revolutions and the PWM Duty calculated and set as described above. In the control processing, a load point value is calculated and added from the motor revolutions and the Duty. Then, a state of the wind generated by running is predicted based on a difference between the sum of the load point values for forward movements and the sum of the load point values for backward movements. When the wind pressure due to the wind generated by running is high, specifically, when it is supposed that an automobile is running at a high speed, an operating angle of the motor (wiping angle of the blade) is reduced to prevent overrun.

Figure 3:
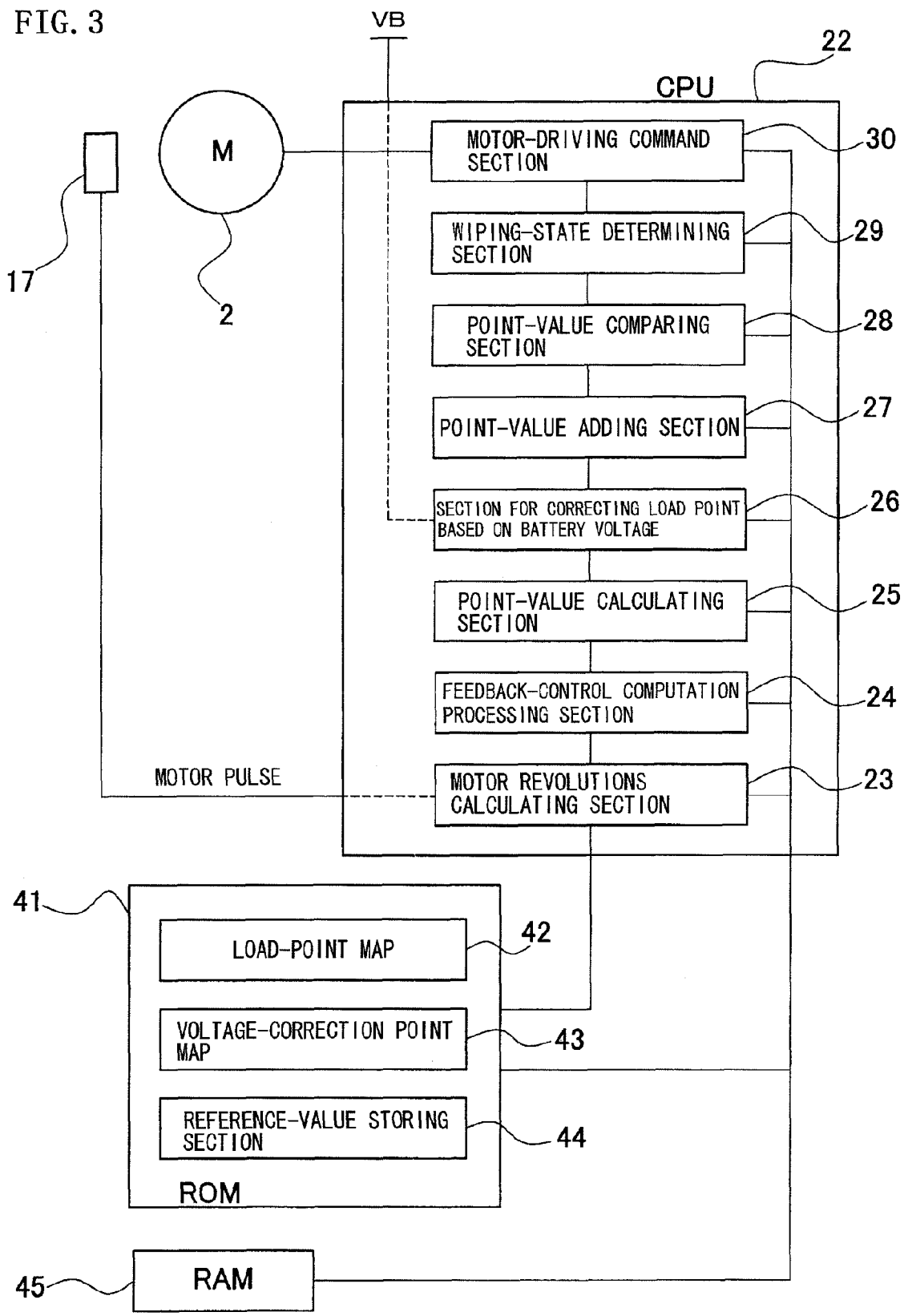
FIG. 3 is a block diagram illustrating a configuration of a predictive processing system for a wind generated by running, which is included in a CPU used in the motor control system illustrated in FIG. 2.

FIG. 3 is a block diagram illustrating a configuration of a predictive processing system for the wind generated by running in the CPU 22. As illustrated in FIG. 3, the CPU 22 includes a motor revolutions calculating section 23 and a feedback-control computation processing section 24. The motor revolutions calculating section 23 calculates the number of revolutions of the motor 2 based on the motor pulses. The feedback-control computation processing section 24 calculates a PWM Duty value by PID control or the like based on the motor revolutions.

In a stage subsequent to the feedback-control computation processing section 24, a point-value calculating section 25 is provided. The point-value calculating section 25 calculates the load point value from the calculated motor revolutions and Duty. The point-value calculating section 25 accesses a load-point map 42 prestored in a ROM 41. Then, the point-value calculating section 25 calculates the load point value from the load-point map 42 based on the motor revolutions, the Duty and the like.

In a stage subsequent to the point-value calculating section 25, a section 26 for correcting the load point value based on a battery voltage (hereinafter, referred to simply as "correcting section 26") is provided. The correcting section 26 corrects the calculated load point value based on the battery voltage. In the ROM 41, a voltage-correction point map 43 is stored together with the load-point map 42 described above. The correcting section 26 obtains a voltage-correction point value from the ROM 41. Then, the obtained voltage-correction point value is appropriately added or subtracted to/from the load point value calculated in the point-value calculating section 25 according to the battery voltage, thereby correcting the point value based on the voltage.

In a stage subsequent to the correcting section 26, a point-value adding section 27 is provided. The point-value adding section 27 accumulatively adds the load point values stored in a RAM 45 to calculate an accumulated load point value Pt. The accumulated load point value Pt thus calculated is stored in the RAM 45.

The CPU 22 further includes a point-value comparing section 28. The point-value comparing section 28 compares the accumulated load point value Pt calculated in the point-value adding section 27 with several reference values stored in the ROM 41. In the ROM 41, a reference-value storing section 44 is provided. In the reference-value storing section 44, threshold values relating to the accumulated load point value Pt are stored. The point-value comparing section 28 appropriately compares the accumulated load point value Pt with the threshold values and then notifies a wiping-state determining section 29, which is provided in a subsequent stage, of the results of the comparison.

The wiping-state determining section 29 detects a current load condition due to the wind generated by running, that is, the effects of the wind generated by running on a blade operation based on the results of comparison between the accumulated load point value Pt and each of the threshold values. Then, the wiping-state determining section 29 determines based on the current load condition whether or not the vehicle is in a high-speed running state. In a stage subsequent to the wiping-state determining section 29, a motor-driving command section 30 is further provided. The motor-driving command section 30 issues an operation command to the motor 2 based on the results of determination in the wiping-state determining section 29.

Figure 4A:
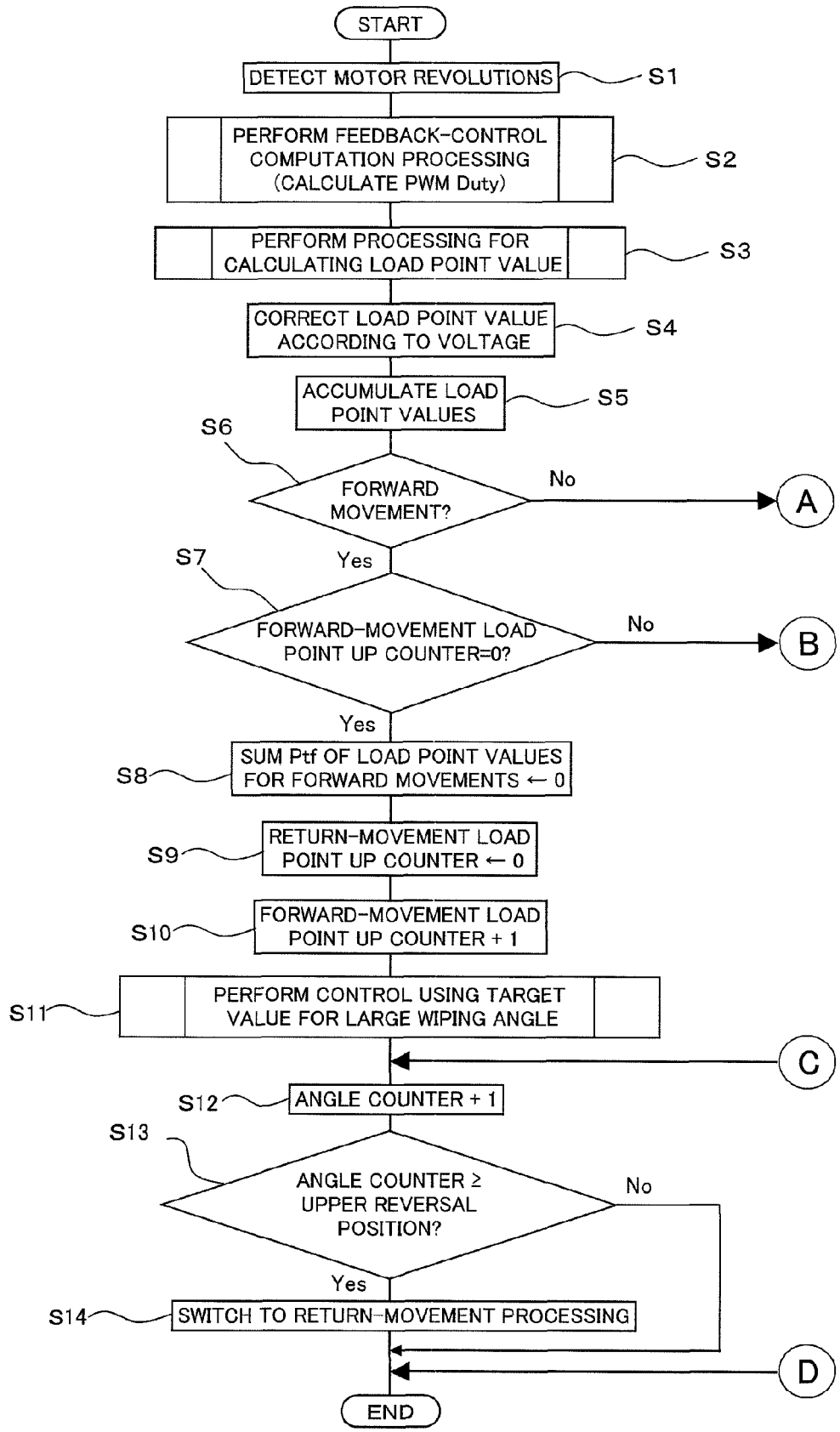
Figure 4C:
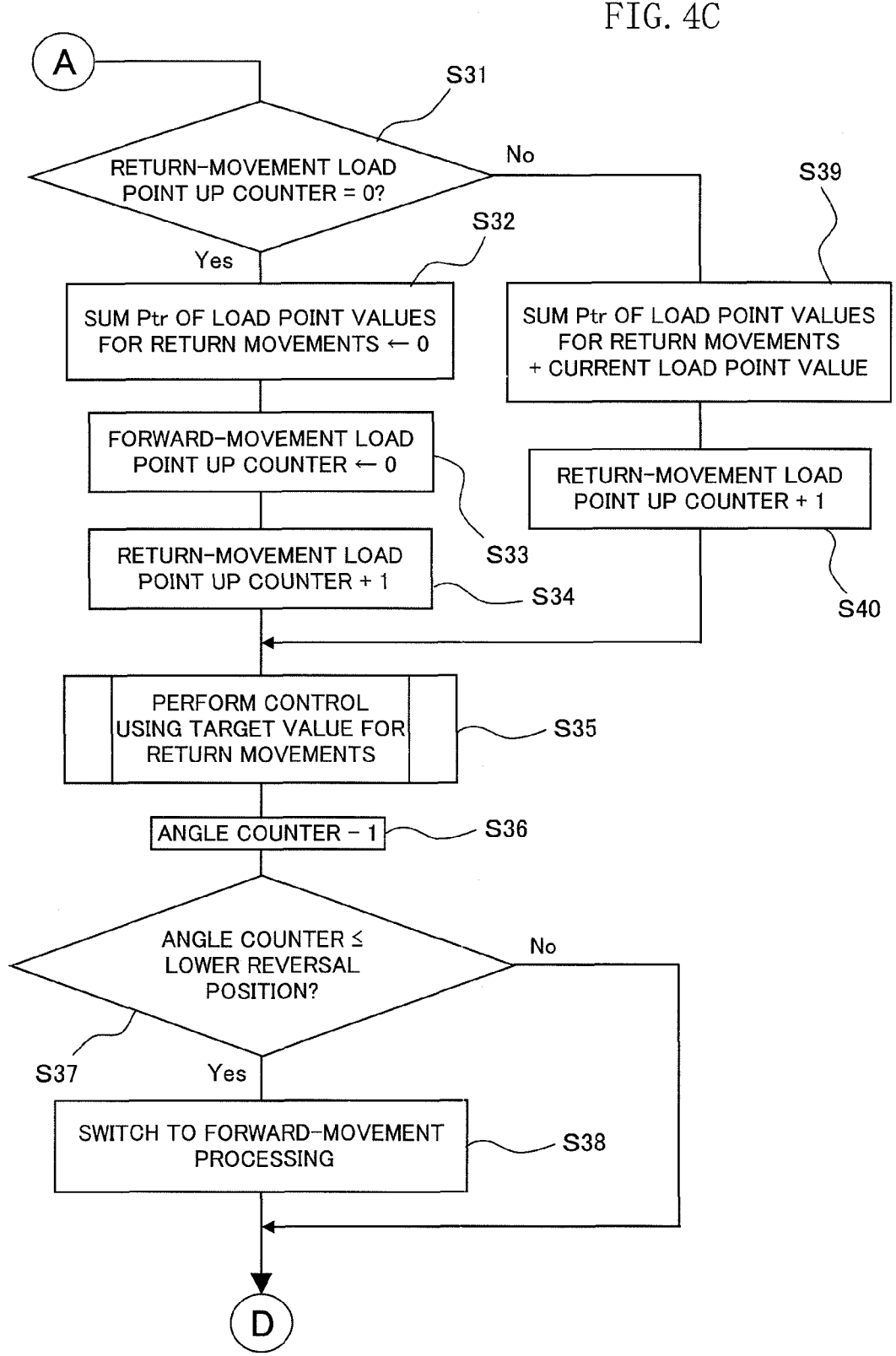

In the CPU 22, the following predictive processing for the wind pressure of the wind generated by running is executed in response to the switching-ON of the wiper switch to actuate the wiper device. FIGS. 4A-4C are flowcharts of the predictive processing for the wind pressure of the wind generated by running. As illustrated in FIG. 4A, first, in Step S1, the number of revolutions of the motor 2 is detected by the motor revolutions calculating section 23. The motor pulses are output from the hall ICs 17 with the rotation of the motor 2. The motor revolutions calculating section 23 detects the number of revolutions of the motor 2 from the motor pulses. After the acquisition of the motor revolutions, the computation processing of the PWM Duty value is performed in Step S2 by the feedback-control computation processing section 24 using the PID control or the like based on the number of revolutions of the motor 2.

After the calculation of the PWM Duty value, the processing proceeds to Step S3 where the load point value is calculated by the point-value calculating section 25. The point-value calculating section 25 calculates the load point value from the motor revolutions and the PWM Duty value by referring to the load-point map 42. The load-point map 42 is created to have the motor revolutions (Hz) and the Duty (%) as parameters. In the load-point map 42, a high point value is set in a condition in which the Duty is high or the number of revolutions is reduced due to a high load.

For example, when the Duty is 80% and the motor speed (motor pulse) is 250 Hz, the load point value of "+10" is obtained. On the other hand, when the motor speed is 500 Hz even though the Duty is the same value, that is, 80%, the load is determined as being low. As a result, the load point value of "0" is obtained. However, when the motor speed is 200 Hz even though the Duty is again 80%, the load is determined as being high. As a result, the load point value of "+15" is obtained. On the other hand, when the Duty is 60% even though the motor speed is the same speed, that is, 250 Hz, the load is determined as being normal and the load point value of "0" is obtained. However, when the Duty is 100% even though the motor speed is again 250 Hz, the load is determined as being high and the load point value of "+15" is obtained. On the other hand, when the motor speed is 1000 Hz even though the Duty is 80%, the load is determined as being low and the load point value of "−5" is obtained. When the motor is stopped, "−20" is set as the load point value.

After the calculation of the load point value in Step S3, the processing proceeds to Step S4 where the load point value is corrected by the correcting section 26 according to the battery voltage. In this step, the load-point map 42 may be created to have the motor revolutions and the Duty as parameters for each power-supply voltage so that the load point value may be calculated to include the power-supply voltage. In this case, the load-point map 42 has a three-dimensional structure in which the maps, each having the motor revolutions and the Duty as the parameters for each of the power-supply voltages, are stacked. In the three-dimensional structure map, the distribution of the points gradually shifts with a change in power-supply voltage. Specifically, the load point value continuously changes between the voltages so as to be shifted from 12 V as a reference to a positive side as the voltage becomes higher and to a negative side as the voltage becomes lower. For example, when the power-supply voltage is 13.5 V, the Duty is 100%, and the motor speed is 333 Hz, the load point value is set to "+15" (to "+10" when the power-supply voltage is 12 V or 13 V under the same conditions).

After the correction of the load point value, the processing proceeds to Step S5 where the calculated load point values are accumulated. The accumulation of the load point values is performed in the point-value adding section 27. The accumulated load point value Pt thus calculated is stored in the RAM 45.

In the manner as described above, the load point value is calculated, corrected, and accumulated to obtain the accumulated load point value Pt. Thereafter, the processing proceeds to Step S6. In Step S6, it is determined whether the wiper device is currently in a forward-movement state or a return-movement state. Whether the wiper device is in the forward-movement state or the return-movement state is determined by determining the direction of rotation of the motor shaft 4. As described above, the direction of rotation of the motor shaft 4 can be determined by the timing of appearance of the pulses from the hall ICs 17. When it is determined that the wiper device is in the forward-movement state, the processing proceeds to Step S7. On the other hand, when it is determined that the wiper device is in the return-movement state, the processing proceeds to Step S31.

The case where it is determined in Step S6 that the wiper device is in the forward-movement state is first described. In this case, the processing proceeds from Step S6 to Step S7, where it is confirmed whether or not a forward-movement load point up counter is zero. The forward-movement load point up counter is a counter indicating a condition of addition of the load point values for forward operations. A value of the forward-movement point up counter is incremented by one each time the load point value is added. Therefore, when the value of the forward-movement load point up counter is zero, it means the condition in which the load point value for the forward movement is not added even once. Specifically, when the value of the forward-movement load point up counter is zero, it means a state in which a first forward wiping operation is just started at the lower reversal position.

When the forward-movement load point up counter is zero in Step S7, the processing proceeds to Step 8. In Step S8, a forward-movement accumulated load point value Ptf obtained by accumulating the load point values for the forward movements is set to zero. Moreover, in Step S9, the return-movement load point up counter is also set to zero. Further, in Step S10, one is added to the value of the forward-movement load point up counter (the value of the counter becomes equal to 1). Then, the processing proceeds to Step S11, where the CPU 22 uses a target value for a wide wiping angle to perform normal wiping-operation control. For the wiping-operation control, an angle counter indicating the current position of the blade is incremented by one in Step S12. After the angle counter is incremented, the processing proceeds to Step S13. In Step S13, it is determined whether or not the value of the angle counter has reached a value indicating the upper reversal position. If the value of the angle counter has not reached the value indicating the upper reversal position, the routine is ended after this step. If the value of the angle counter has reached the value indicating the upper reversal position, it is determined that the blade is located at the upper reversal position. Then, the processing proceeds to Step 14, where the processing is switched to processing for a return operation.

On the other hand, when the value of the forward-movement load point up counter is not zero in Step S7, the processing proceeds to Step S15. In Step S15, the current load point value is added to the forward-movement accumulated load point value Ptf. After the addition of the current load point value, one is added to the value of the forward-movement load point up counter in Step S16. After the addition to the value of the forward-movement load point up counter, the processing proceeds to Step S17. In Step S17, it is determined whether or not the current wiping operation is a first wiping operation after the wiper switch is turned ON. As described above, in the processing, a state of the wind generated by running is predicted based on the difference between the sum of the load point values for the forward movements and the sum of the load point values for the return movements. Therefore, in the case where the current wiping operation is the first wiping operation, data for the return movement is not obtained because the first wiping operation is the forward operation. Therefore, the difference between the sum of the load point values for the forward movements and that for the return movements cannot be obtained. Thus, in Step S17, it is confirmed whether or not the wiping operation is the first wiping operation. When the wiping operation is the first wiping operation, initial processing as performed in Steps S18 to S22 is performed.

In Step S18, it is determined whether or not the current blade position (motor-shaft angle) has reached a preset angle for determining the switching of the operating angle. When the motor-shaft angle has reached the angle for determining the switching of the operating angle, the forward-movement accumulated load point value Ptf is compared with a predetermined criterion threshold value A (SVa) in Step S19. In this case, the angle for determining the switching of the operating angle corresponds to a reference position at which the blade has a fear of moving beyond the upper reversal position when the forward-movement accumulated load point value Ptf exceeds the criterion threshold value SVa. Specifically, for example, in the case where Ptf>SVa is satisfied when the blade is at the position of 60 degrees, it is supposed that the vehicle is in the high-speed running state. Therefore, if the blade is actuated in this state, there is a fear of causing the overrun.

When the relation: Ptf>SVa is determined by the point-value comparing section 28 in Step S19, the processing proceeds to Step S20. In Step S20, it is determined by the wiping-state determining section 29 that the vehicle is in the high-speed running state. In response to the determination, the motor-driving command section 30 uses a target value for a small wiping angle to control the wiper device (motor 2). Specifically, an angle of rotation of the motor shaft 4 is set small to narrow a wiping area (wiping angle) of the blade so as to set the upper reversal position closer to the return side than a given position. In this manner, the reversal operation is performed at the position set closer to the return side than the normal upper reversal position. Therefore, even if the blade or the like is deflected by the wind generated by running when the vehicle is running at the high speed, the overrun is not caused so that the direction of operation of the blade is reversed at substantially the normal upper reversal position. After the control with the target value for the small wiping angle is performed, the angle counter is incremented in Step S12. Thereafter, the processing in Steps S13 and S14 is performed, and the routine is ended.

On the other hand, in Step S18, if the blade has not reached the angle for determining the switching of the operating angle, the normal control is performed until it is determined that the blade has reached the angle for determining the switching of the operating angle. Specifically, the processing proceeds to Step S21, where the wiping-operation control using the target value for the wide wiping angle is performed. When Ptf≤SVa is satisfied in Step S19, it is determined that there is no fear of the overrun. Therefore, the processing proceeds to Step S22, where the wiping-operation control is performed using the target value for the wide wiping angle. After the control with the target value for the wide wiping angle is performed in Steps S21 and S22, the angle counter is incremented in Step S12. Thereafter, the processing in Steps S13 and S14 is performed, and then the routine is ended.

In the case of a second or subsequent wiping operation after the initial processing as described above, the processing proceeds from Step S17 to Step S23. In Step S23, a difference Ptd between the accumulated load point value for the forward movements and the accumulated load point value for the return movements (hereinafter, referred to simply as "difference Ptd") corresponding to a difference between the forward-movement accumulated load point value Ptf and the return-movement accumulated load point value Ptr is calculated. The return-movement accumulated load point value Ptr is already obtained by the processing starting in Step S31 after the first reciprocating wiping operation is finished. In Step S23, the difference Ptd is calculated by using the already calculated Ptr and the current Ptf. The difference Ptd calculated in Step S23 is compared with a predetermined criterion threshold value B (SVb) in a subsequent Step S24. In the wiper device for a windshield, the blade is pushed toward the upper reversal position by the wind generated by running. Therefore, as a running speed of the vehicle becomes higher, an operation load during the forward movement is reduced and an operation load during the return movement is increased. Therefore, the difference between the accumulated load point values Ptf and Ptr increases as the running speed becomes higher. Thus, as the difference Ptd between Ptf and Ptr increases, the possibility of occurrence of overrun becomes higher.

Accordingly, in the control processing, the difference Ptd is compared with the criterion threshold value SVb experimentally obtained in advance as a limit value at which the overrun has the possibility of occurring (Step S24). When Ptd≥SVb is satisfied, the processing proceeds to Step S25, where the target value for the small wiping angle is used to control the wiper device. Specifically, the wiping angle of the blade is reduced to set the upper reversal position closer to the return side than the given position. In this manner, the wiper device is controlled so as not to cause the overrun even if the blade or the like is deflected by the wind generated by running when the vehicle is running at the high speed. After the control with the target value for the small wiping angle is performed, the angle counter is incremented in Step S12. Thereafter, the processing in Steps S13 and S14 is performed, and then the routine is ended.

On the other hand, when Ptf<SVb is satisfied in Step S24, a difference between the forward-movement accumulated load point value Ptf and the return-movement accumulated load point value Ptr is not quite large. Therefore, the CPU 22 determines that there is no fear of overrun, and the processing proceeds to Step S26, where the wiping-operation control using the target value for the wide wiping angle is performed. After the control with the target value for the wide wiping angle is performed in Step S26, the angle counter is incremented in Step S12. Thereafter, the processing in Steps S13 and S14 is performed, and then the routine is ended. In Step S26, when the sum of the accumulated load point values Ptf and Ptr is large, it may be determined that the wiper device is operated in a semi-dry state so as to increase an angle at which the blade is returned.

Next, control processing for the return movement, which is started in Step S31 is described. When it is determined in Step S6 that the wiper device is in the return-movement state, the processing proceeds from Step S6 to Step S31. In Step S31, it is confirmed whether the value of a return-movement load point up counter is zero or not. Similarly to the forward-movement load point up counter, the return-movement load point up counter is also a counter indicating a condition of addition of the load point values for the return operations and is incremented by one each time the load point value is added. Therefore, when the value of the return-movement load point up counter is zero, it means the condition in which the load point value for the return movement is not added even once. Specifically, when a value of the return-movement load point up counter is zero, it means a state in which a first return wiping operation is just started at the upper reversal position.

When the return-movement load point up counter is equal to zero in Step S31, the processing proceeds to Step S32 where the return-movement accumulated load point value Ptr obtained by accumulating the load point values for the return movements is set to zero. Moreover, in Step S33, the forward-movement load point up counter is also set to zero. Further, in Step S34, one is added to the return-movement load point up counter (the value of the counter becomes equal to 1). Then, the processing proceeds to Step S35, where the target value for the large wiping angle is used to perform the normal wiping-operation control. For the wiping-operation control, the angle counter indicating the current position of the blade is decremented by one in Step S36. After the angle counter is decremented, the processing proceeds to Step S37, where it is determined whether or not the value of the angle counter has reached a value indicating the lower reversal position. When the value of the angle counter has not reached the value indicating the lower reversal position, the routine is ended. On the other hand, when the value of the angle counter has reached the value indicating the lower reversal position, it is determined that the blade has reached the lower reversal position. Therefore, the processing proceeds to Step S38, where the processing is switched to the processing for the forward operation.

On the other hand, when the return-movement load point up counter is not zero in Step S31, the processing proceeds to Step S39, where the currently obtained load point value is added to the return-movement accumulated load point value Ptr. After the addition of the current load point value, one is added to the value of the return-movement load point up counter. After the addition of one to the value of the return-movement load point up counter, the processing proceeds to Step S35, where the target value for the large wiping angle is used to perform the normal wiping-operation control. After the processing after Step S36 is performed, the routine is ended.

As described above, according to the control processing of the present invention, attention is focused on the large difference Ptd between the forward-movement accumulated load point value Ptf and the return-movement accumulated load point value Ptr when the vehicle is running at the high speed. When the difference Ptd becomes equal to or larger than the predetermined threshold value, the high-speed running state which has the possibility of causing the overrun is determined. Then, the target value of the wiping angle is set small so as not to cause the overrun at the upper reversal position due to the deflection of the blade or the like when the vehicle is running at the high speed. Specifically, the wind-pressure load is predicted from the difference Ptd between the forward-movement accumulated load point value Ptf and the return-movement accumulated load point value Ptr. When the wind pressure is high, the operating angle of the motor 2 is set small. In this manner, the overrun, which may be caused when the vehicle is running at the high speed, is prevented from occurring, which can in turn prevent a problem such as the overtravel of the blade beyond the predetermined reversal position to cause the collision of the blade against a pillar. Moreover, it is no longer necessary to set the wiping angle during the normal wiping operation in consideration of the overrun which may be caused when the vehicle is running at the high speed. Therefore, the wiping angle during the normal wiping operation can be set large. As a result, a wider field of view can be ensured when it rains as compared with a conventionally obtained field of view when it rains.

Embodiment 2

As described above, in the control processing according to Embodiment 1, the wiping angle is appropriately changed based on the difference Ptd between the forward-movement accumulated load point value and the return-movement accumulated load point value to prevent the overrun when the vehicle is running at the high speed. Even at the same vehicle speed, however, the amount of overrun differs between the case where a glass surface is in a wet state and the case where the glass surface is a dry state. Therefore, by merely changing the wiping angle based on vehicle-speed information, the wiping angle is excessively narrowed to make it difficult to ensure the precision of the reversal positions. Therefore, in control processing according to Embodiment 2 of the present invention, the types of the accumulated load point value are classified into three, that is, (1) the sum for the forward movements, (2) the sum for the return movements, and (3) a difference between the sum for the forward movements and the sum for the return movements. Then, by combining a wiping mode (Hi/Lo) and the values (1) to (3), load conditions are classified into a larger number of categories to improve the precision of the reversal positions. The control processing according to Embodiment 2 is performed by the motor unit (FIG. 1) and the motor control system (FIG. 2) similar to those of Embodiment 1. Therefore, the components and parts similar to those of Embodiment 1 are denoted by the same reference numerals, and the description thereof is herein omitted.

Similarly to Embodiment 1, the control processing according to Embodiment 2 is performed in the predictive processing system according to Embodiment 1, which is illustrated in FIG. 3. In the control processing according to Embodiment 2, however, the point-value comparing section 28 compares the forward-movement accumulated load point value Ptf, the return-movement accumulated load point value Ptr, and the difference Ptd between Ptf and Ptr with a plurality of reference values stored in the ROM 41. In the reference-value storing section 44 included in the ROM 41, a plurality of threshold values respectively for the values Ptf, Ptr, and Ptd (for the forward-movement accumulated load point value, the return-movement accumulated load point value, and the difference between the forward-movement accumulated load point value and the return-movement accumulated load point value when the wiper device is operated in the Hi speed mode, and the forward-movement accumulated load point value, the return-movement accumulated load point value, and the difference between the forward-movement accumulated load point value and the return-movement accumulated load point value when the wiper device is operated in the Lo speed mode) are stored. The point-value comparing section 28 appropriately compares the accumulated load point values Ptf and Ptr and the difference Ptd between Ptf and Ptr with the aforementioned threshold values and then notifies the wiping-state determining section 29, which is provided in the subsequent stage, of the results of the comparisons. The wiping-state determining section 29 determines the current wiping state based on the results of the comparisons between the accumulated load point values Ptf and Ptr and the corresponding threshold values. Specifically, in the wiping-state determining section 29, it is determined whether the wiping operation is currently performed in the high-speed running state, in the wet state, or the dry state.

Figure 5A:
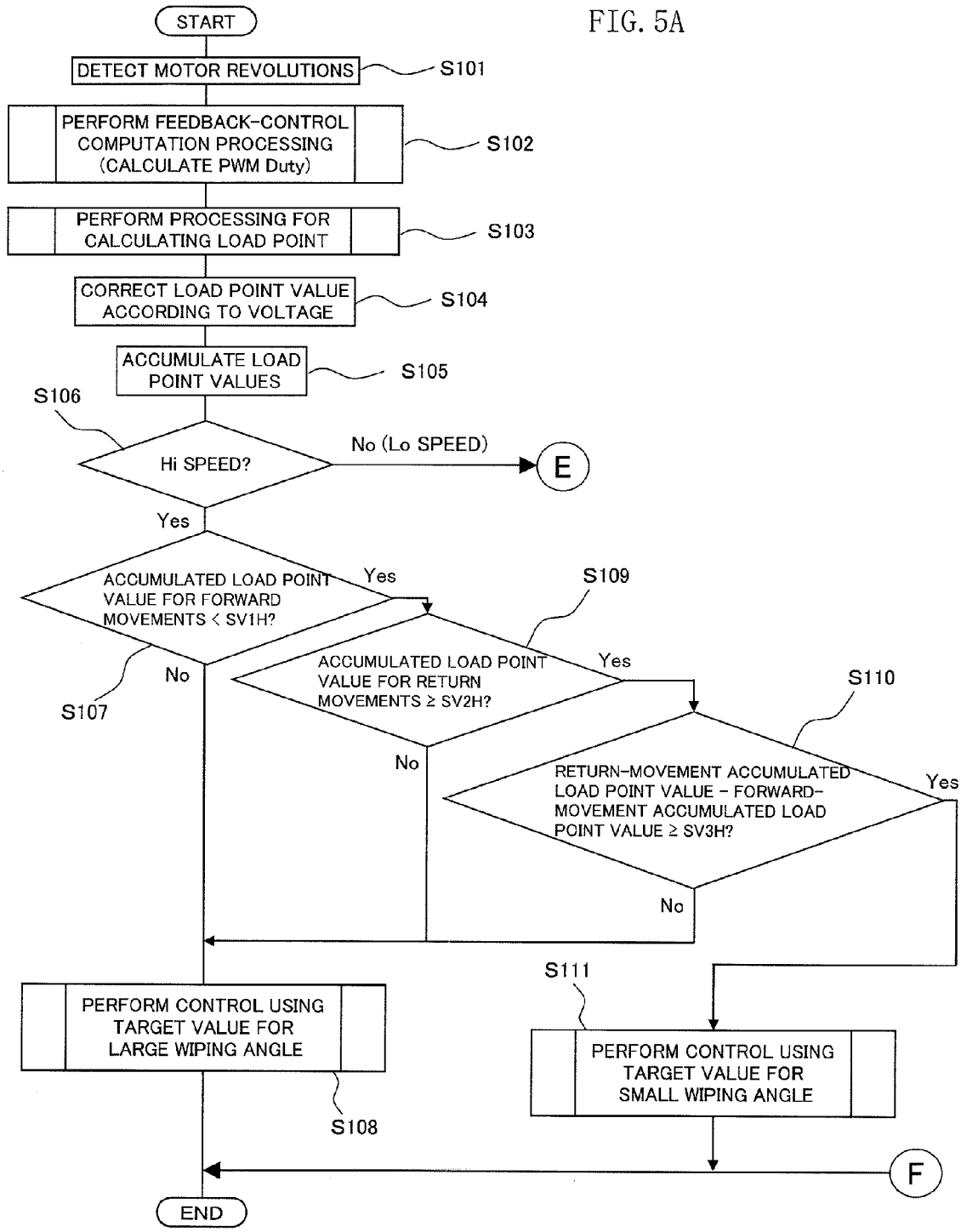
FIGS. 5A, 5B are flowcharts of control processing according to Embodiment 2 of the present invention.
Figure 5B:
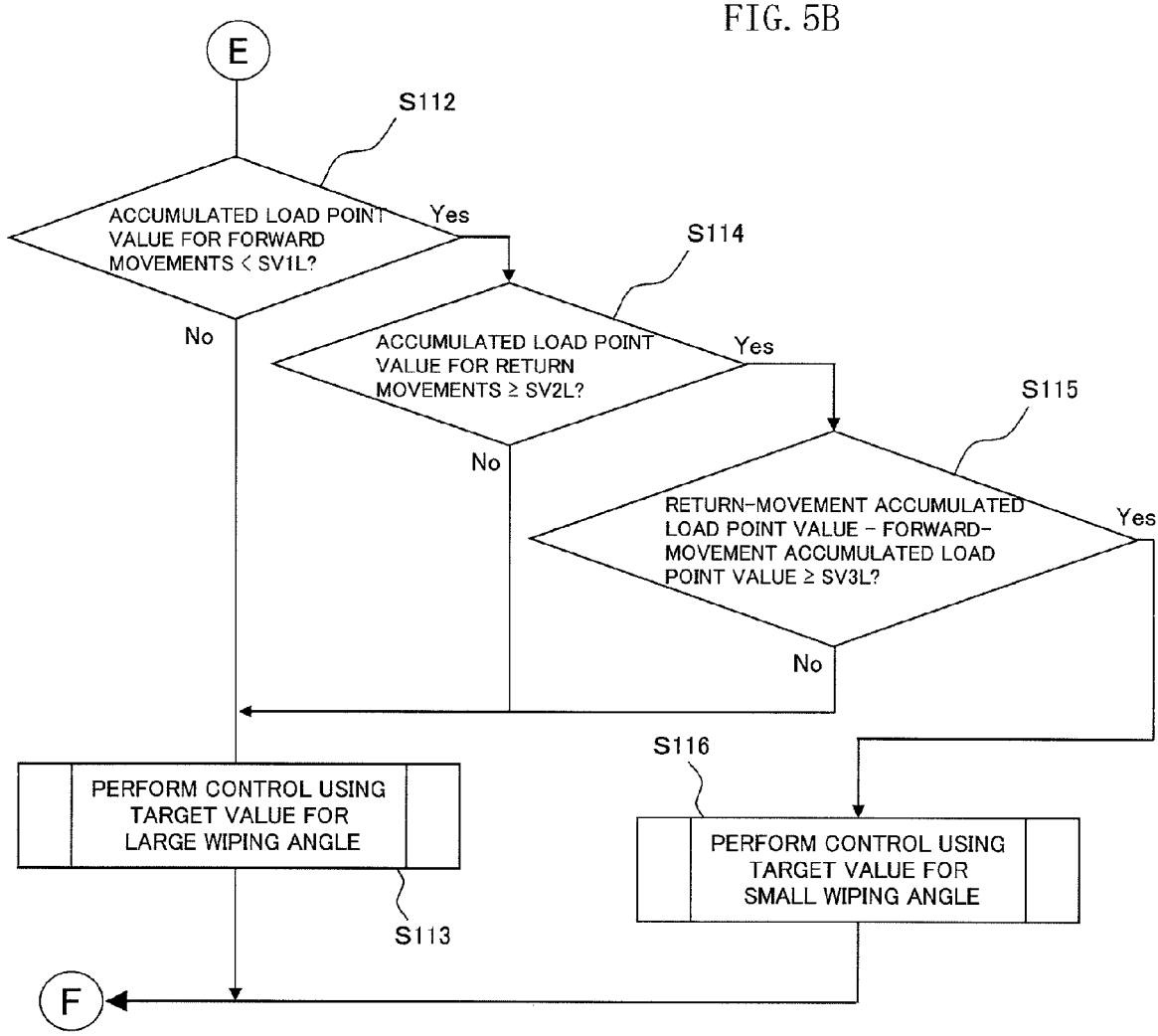

FIGS. 5A, 5B are flowcharts of control processing according to Embodiment 2 of the present invention. As illustrated in FIG. 5A, first, in Step S101, the number of revolutions of the motor 2 is detected by the motor revolutions calculating section 23. After the acquisition of the motor revolutions, the computation processing of the PWM Duty value is performed in Step S102 by the feedback-control computation processing section 24 using the PID control or the like based on the number of revolutions of the motor 2. After the calculation of the PWM Duty value, the processing proceeds to Step S103. In Step S103, the load point value is calculated by the point-value calculating section 25 from the motor revolutions and the PWM Duty value by referring to the load-point map 42.

After the calculation of the load point value in Step S103, the processing proceeds to Step S104. In Step S104, the load point value is corrected by the correcting section 26 according to the battery voltage. After the correction of the load point value, the processing proceeds to Step S105, where the calculated load point values are accumulated. The accumulation of the load point values is performed in the point-value adding section 27. The accumulated load point values Ptf and PTr thus calculated are stored in the RAM 45.

In the manner as described above, the load point value is calculated, corrected, and accumulated to obtain the accumulated load point values Ptf and Ptr. Thereafter, the processing proceeds to Step S106. In Step S106, the current wiping mode (Hi or Lo) is determined. As described above, in the control processing according to Embodiment 2, three threshold values (for the accumulated load point value for the forward movements, the accumulated load point value for the return movements, and the difference in load point value between the forward movements and the return movements, and therefore, six threshold values in total) are set for the accumulated load point values Ptf and Ptr for each of the operation modes Hi and Lo. After Step S106, by the comparisons with the threshold values described above, the current wiper-device operating condition is determined to appropriately control the operation of the motor 2 (operation of the wiper device).

When it is determined that the wiper device is currently operated in the Hi speed mode as a result of the determination of the current wiping mode in Step S106, the processing proceeds to Step S107. In Step S107, the point-value comparing section 28 compares the forward-movement accumulated load point value Ptf with a criterion threshold value $SV1_H$ (first threshold value) when the wiper device is operated in the Hi speed mode (the subscripts H and L to the threshold values indicate the values used when the wiper device is operated in the Hi speed mode and when the wiper device is operated in the Lo speed mode, respectively). When the blade is operated in the dry state, a resistance between the blade and the glass surface becomes larger. Therefore, as compared with the wet state, the accumulated load point value Ptf is increased. Therefore, the threshold value $SV1_H$ is set as a threshold value for distinguishing the dry state and the wet state from each other. When Ptf is equal to or larger than $SV1_H$, it is determined that the wiper device is operated in the dry state. Therefore, the processing proceeds to Step S108, where the wiping-state determining section 29 determines that the wiping operation is performed in the dry state. When the wiper device is operated in the dry state, the overrun of the blade is unlikely to occur. Therefore, the motor-driving command section 30 uses the target value for the large wiping angle to perform the wiping-operation control based on the determination of the dry state. Then, the routine is ended.

When Ptf is less than $SV1_H$ in Step S107, the processing proceeds to Step S109. In Step S109, the return-movement accumulated load point value Ptr and a criterion threshold value $SV2_H$ (second threshold value) are compared with each other. When Ptf is less than $SV2_H$ (Ptf<$SV1_H$ and Ptf<$SV2_H$), it is determined that the normal wiping operation is performed in the wet state. Then, the processing proceeds to Step S108. In Step S108, the target value for the large wiping angle is used to perform the wiping-operation control. Then, the routine is ended. On the other hand, when Ptr is equal to or larger than $SV2_H$, the processing proceeds to Step S110. In Step S110, the difference Ptd between the forward-movement accumulated load point value Ptf and the return-movement accumulated load point value Ptr and a criterion threshold value $SV3_H$ (third threshold value) are compared with each other. When the difference Ptd is less than $SV3_H$, the wiping operation is not currently performed in the dry state and the vehicle is not running at the high speed, although the return-movement accumulated load point value Ptr is large. Therefore, the processing proceeds to Step S108, where the target value for the large wiping angle is used to perform the wiping-operation control. Then, the routine is ended.

When Ptd is equal to or larger than $SV3_H$ in Step S110, the processing proceeds to Step S111. When Ptd≥$SV3_H$ is satisfied, the wiper device is operated in the dry state or the vehicle is running at the high speed. On the other hand, in this case, it is already determined in Step S107 that the wiper device is not operated in the dry state (Ptd<$SV1_H$). Therefore, when Ptd≥$SV3_H$ is satisfied, the wiping-state determining section 29 determines that the vehicle is in the high-speed running state. Based on the determination of the high-speed running state, the motor-driving command section 30 uses the target value for the small wiping angle to control the wiper device. Then, the routine is ended. Specifically, the wiping area of the blade is narrowed so that the upper reversal position is set closer to the return side than the given position. In this manner, the wiper device is controlled so that the overrun is not caused even if the blade or the like is deflected by the wind generated by running when the vehicle is running at the high speed.

On the other hand, when it is determined that the wiper device is currently operated in the Lo speed mode as a result of the determination of the current wiping mode in Step S106, the processing proceeds to Step S112. In Step S112, the forward-movement accumulated load point value Ptf and a criterion threshold value $SV1_L$ (first threshold value) are compared with each other. When Ptf is equal to or larger than $SV1_L$, it is determined that the wiper device is operated in the dry state. Then, the processing proceeds to Step S113. In Step S113, the target value for the large wiping angle is used to control the wiper device. Then, the routine is ended. When Ptf is less than $SV1_K$ in Step S112, the processing proceeds to Step S114. In Step S114, the return-movement accumulated load point value Ptr and a criterion threshold value $SV2_L$ (second threshold value) are compared with each other. When Ptr is less than $SV2_L$ (Ptf<$SV1_L$ and Ptf<$SV2_L$), it is determined that the normal wiping operation is performed in the wet state. Then, the processing proceeds to Step S113, where the target value for the large wiping angle is used to perform the wiping operation control. Then, the routine is ended.

On the other hand, when Ptr is equal to or larger than $SV2_L$, the processing proceeds to Step S115. In Step S115, the difference Ptd between the forward-movement accumulated load point value Ptf and the return-movement accumulated load point value Ptr and a criterion threshold value $SV3_L$ (third threshold value) are compared with each other. When the difference Ptd between the forward-movement accumulated load point value Ptf and the return-movement accumulated load point value Ptr is less than the threshold value $SV3_L$, the wiper device is not operated in the dry state and the vehicle is not in the high-speed running state, although the return-movement accumulated load point value Ptr is large. Therefore, the processing proceeds to Step S113, where the target value for the large wiping angle is used to perform the wiping-operation, control. Then, the routine is ended.

When the difference Ptd is equal to or larger than. $SV3_L$ in Step S115, the processing proceeds to Step S116. In Step S116, similarly to the aforementioned case, the wiping-state determining section 29 determines that the vehicle is in the high-speed running state. Then, the motor-driving command section 30 uses the target value for the small wiping angle to control the wiper device based on the determination. Then, the routine is ended. Specifically, the wiping area of the blade is narrowed to control the wiper device so as not to cause the overrun even if the blade or the like is deflected by the wind generated by running when the vehicle is running at the high speed.

The present invention is not limited to the embodiments described above. It is apparent that various changes are possible without departing from the scope of the invention.

For example, in Embodiment 2 described above, the control using the target value for the same large wiping angle is performed for both the wet state and the dry state. However, in the wet state, a wiping resistance is smaller than that in the dry state. Therefore, the overrun is rather likely to be caused than in the dry state. Therefore, a third target value is set between the target value for the large wiping angle (first target value)

and the target value for the small wiping angle (second target value). In this manner, the third target value may be used to control the wiper device (motor 2) in the case of the wet state. Specifically, when Ptr<SV2$_H$ is satisfied in Step S109 or Ptr<SV2$_L$ is satisfied in Step S114 in FIG. 5B, a step, in which the wiping-operation control using the third target value is performed, may be carried out.

Figure 6:
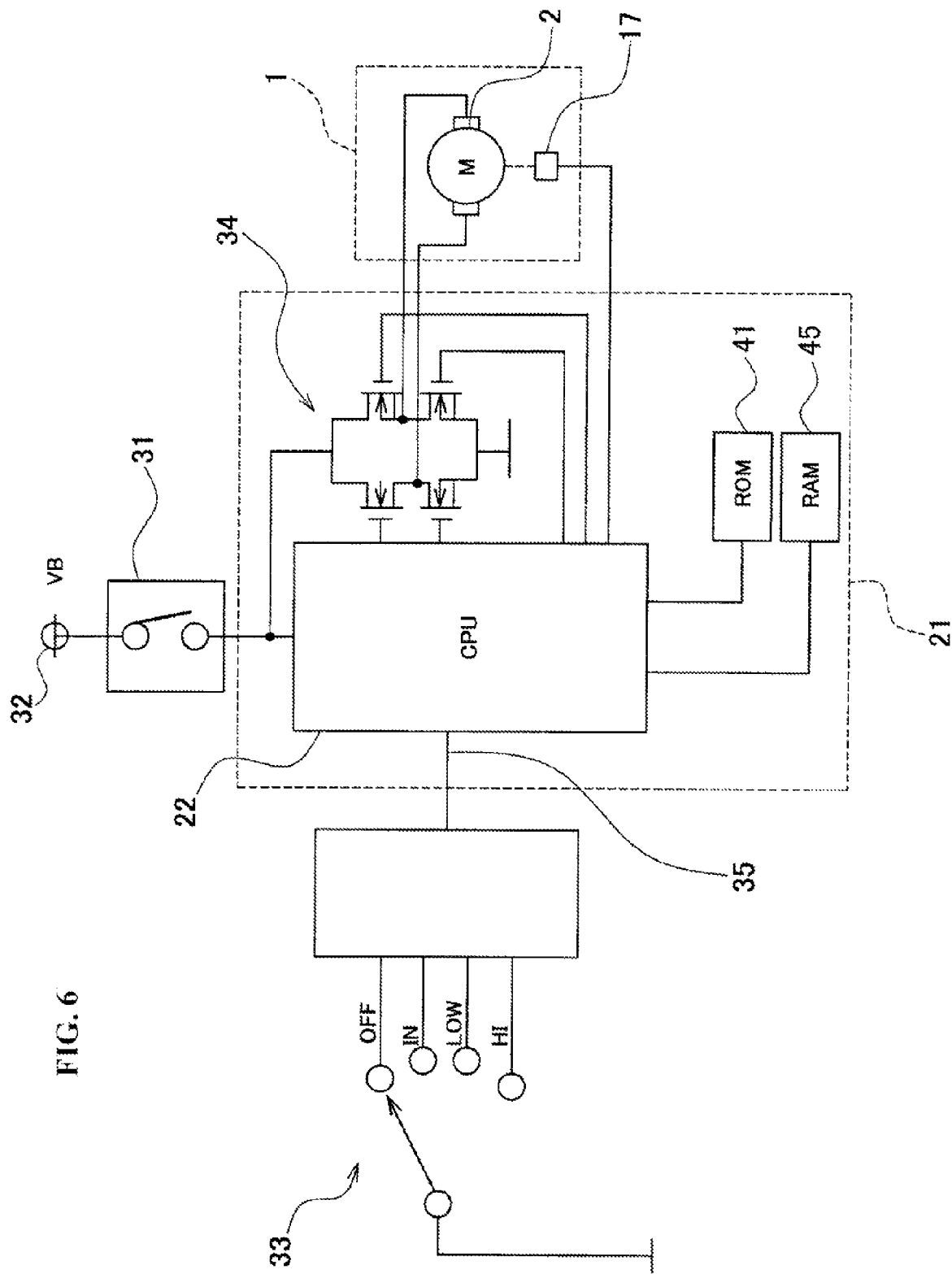
FIG. 6 is an explanatory view of a reversible rotary motor.

On the other hand, a motor different from that disclosed in FIG. 2 is disclosed in FIG. 6. Specifically, a reversible rotary motor including an H-bridge circuit 34 is disclosed. The present invention is also applicable to the reversible rotary motor as illustrated in FIG. 6. In the motor illustrated in FIG. 6, the CPU 22 and the wiper switch 33 are connected through an intermediation of a communication line 35. The wiper device is controlled according to control information transmitted from the communication line 35. The reference numerals disclosed in FIG. 6 are the same as those of FIG. 2 for the components common to FIG. 2.

Further, although the two hall ICs are used for output of an angle sensor in the embodiments described above, the magnet may be provided only to the worm wheel and a single absolute-position detection sensor such as an MR sensor may be used. Alternatively, a rotation angle sensor can also be used. Further, although the embodiments describing the brush motor using the brush have been disclosed, the control may be performed using a brushless motor.

What is claimed is:

1. A wiper control device for controlling driving of a wiper device including a wiper blade provided on a surface to be wiped of a vehicle and an electric motor for driving the wiper blade, comprising:
   a storage section for storing a point value set corresponding to a load state of the electric motor;
   a point-value calculating section for detecting a current load state of the electric motor to calculate a load point value of the electric motor from the detected load state based on the point value stored in the storage section;
   a point-value adding section for accumulating the load point values to calculate an accumulated load point value;
   a point-value comparing section for comparing a difference between the accumulated load point value for forward operations of the wiper blade and the accumulated load point value for return operations of the wiper blade with a predetermined threshold value;
   a wiping-state determining section for detecting effects of a wind-pressure load due to a wind generated by running on the wiper blade based on results of the comparison in the point-value comparing section to determine whether the vehicle is in a high-speed running state; and
   a motor-driving command section for issuing an operation command to the electric motor based on results of the determination in the wiping-state determining section.

2. A wiper control device according to claim 1, wherein the wiping-state determining section determines that the vehicle is in the high-speed running state when the difference between the accumulated load point value for the forward operations of the wiper blade and the accumulated load point value for the return operations of the wiper blade exceeds the predetermined threshold value, and commands the motor-driving command section to reduce an angle of rotation of the electric motor to narrow a wiping angle of the wiper blade.

3. A wiper control device for controlling driving of a wiper device including a wiper blade provided on a surface to be wiped of a vehicle and an electric motor for driving the wiper blade, comprising:
   a storage section for storing a point value set corresponding to a load state of the electric motor;
   a point-value calculating section for detecting a current load state of the electric motor to calculate a load point value of the electric motor from the detected load state based on the point value stored in the storage section;
   a point-value adding section for accumulating the load point values to calculate an accumulated load point value;
   a point-value comparing section for comparing the accumulated load point value for forward operations of the wiper blade with a first threshold value, comparing the accumulated load point value for return operations of the wiper blade with a second threshold value, and comparing a difference between the accumulated load point value for the forward operations of the wiper blade and the accumulated load point value for the return operations of the wiper blade with a third threshold value;
   a wiping-state determining section for detecting effects of a wind-pressure load due to a wind generated by running on the wiper blade based on results of the comparison in the point-value comparing section to determine whether the vehicle is in a high-speed running state; and
   a motor-driving command section for issuing an operation command to the electric motor based on results of the determination in the wiping-state determining section.

4. A wiper control device according to claim 3, wherein the wiping-state determining section determines that the vehicle is in the high-speed running state when the difference between the accumulated load point value for the forward operations of the wiper blade and the accumulated load point value for the return operations of the wiper blade is equal to or larger than the third threshold value in a case where the accumulated load point value for the forward operations of the wiper blade is less than the first threshold value and the accumulated load point value for the return operations of the wiper blade is equal to or larger than the second threshold value, and commands the motor-driving command section to reduce an angle of rotation of the electric motor to narrow a wiping angle of the wiper blade.

5. A wiper control device according to claim 3, wherein each of the first threshold value, the second threshold value, and the third threshold value is set to a different value for a case where an operation of the wiper blade is performed in a Hi speed mode and for a case where the operation of the wiper blade is performed in a Lo speed mode.

* * * * *